United States Patent [19]

Hills et al.

[11] Patent Number: 4,839,813

[45] Date of Patent: Jun. 13, 1989

[54] COMPUTERIZED PARCEL SHIPPING SYSTEM

[75] Inventors: Karen F. Hills, Norwalk; Paul H. Mitchell, Danbury, both of Conn.

[73] Assignee: Pitney Bowes Inc., Stamford, Conn.

[21] Appl. No.: 790,712

[22] Filed: Oct. 24, 1985

[51] Int. Cl.[4] .................................. G06F 15/22
[52] U.S. Cl. ........................ 364/464.03; 364/200; 364/401
[58] Field of Search ............ 364/464, 466, 401, 406, 364/407, 408, 412, 200 MS File, 403, 464.03

[56] References Cited

U.S. PATENT DOCUMENTS

| | | | |
|---|---|---|---|
| 2,995,729 | 8/1961 | Steele | 364/200 |
| 3,343,133 | 9/1967 | Dirks | 364/200 |
| 3,978,457 | 8/1976 | Check, Jr. et al. | 364/200 |
| 4,135,241 | 1/1979 | Stanis et al. | 364/403 X |
| 4,346,442 | 8/1982 | Musmanno | 364/406 |
| 4,366,552 | 12/1982 | Uchimura et al. | 364/466 |
| 4,376,978 | 3/1983 | Musmanno | 364/408 |
| 4,377,214 | 3/1983 | Hansen et al. | 364/464.03 X |
| 4,383,298 | 5/1983 | Huff et al. | 364/403 X |
| 4,420,819 | 12/1983 | Price et al. | 364/466 X |
| 4,455,483 | 6/1984 | Schönhuber | 364/403 X |
| 4,470,819 | 12/1983 | Price et al. | 364/466 |
| 4,503,503 | 3/1985 | Suzuki | 364/406 |
| 4,511,793 | 4/1985 | Racanelli | 364/466 X |
| 4,513,375 | 4/1985 | Bruce | 364/401 |
| 4,597,046 | 6/1986 | Musmanna et al. | 364/408 |
| 4,642,767 | 2/1987 | Lerner | 364/406 |
| 4,737,911 | 4/1988 | Freeman, Jr. | 364/408 X |

Primary Examiner—Parshotam S. Lall
Assistant Examiner—Edward R. Cosimano
Attorney, Agent, or Firm—Robert H. Whisker; Melvin J. Scolnick; David E. Pitchenik

[57] ABSTRACT

A computerized partial shipping system wherein transactions related to a plurality of carriers are recorded in a single file. The file has a pair of counters for each carrier, with the first counter storing the total number of transactions recorded for that carrier and the second counter storing the number of closed transaction records for that carrier. The programs enable the archiving of the records, and updating the records of the file.

14 Claims, 5 Drawing Sheets

FIG. I

COMPUTERIZED PARCEL SHIPPING SYSTEM

BACKGROUND OF THE INVENTION

This invention is directed to improvements in parcel shipping systems wherein parcels to be shipped are tracked or recorded, the invention being concerned with a system of this type wherein a computer is employed to record the transactions on a record medium such as a disc or the like.

In the shipping of parcels, it is frequently desirable to make provision for shipping by more than one carrier. In current shipping practice, provision must be made for the shipping of parcels by two major carriers, such as the United States Postal System (USPS) and the United Parcel Service (UPS), a private carrier, as well as any of a large number of smaller private carriers. In prior tracking or recording systems, various data concerning parcels or groups of parcels to be shipped were entered by an operator, so that the information could be stored in the records of a transaction disc. The "transactions" recorded on the transacting disc include information relating to the shipment, such as, for example, the identification of the carrier, the number of packages in the shipment, the weight, address data, charges, date and time, invoice number, etc. Factors such as weight were entered either manually or automatically by a scale, while other factors such as zip code were generally entered by an operator by way of a keyboard. Such systems contemplated the provision in the programs of routines that determined shipping costs on the basis of the information that was input.

With respect to the major carriers, prior systems made provision for the reservation of space on the transaction disk for each carrier. With respect to such major carrier, it is conventionally the practice to provide a pickup of all parcels at given times, so that all of the transactions for that carrier could be achieved, i.e. stored on an archive disc and deleted from the transaction disk; as a block, to thereby enable the entry of further transactions. As an example, when the USPS picked up a shipment, the shipment generally included all current transactions recorded on the portion of the disc assigned to the USPS, so that archiving the data to an archive disc and deleting the data from the permanent portion of the disc reserved for the USPS was feasible and practical, and enabled the clearing of the relevant portion of the transaction disc for the entry of further transactions in a simple manner.

While UPS and USPS are currently the major carriers for many shippers, there are a large number of carriers that are frequently employed, and a versatile computerized parcel shipping system thereby requires the tracking or recording of data corresponding to shipments to be made by such other carriers. In view of the large number of such other carriers, however, it is not feasible to record the transactions in the same manner as for the major carriers. Thus, reserving a discrete block of disc memory adequate to handle each of the possible transactions concerning such other carriers is not feasible since insufficient memory exists on the discs for treating transactions concerning these smaller carriers in the same manner as the major carriers. Major shippers require the reservation of individually determinable record space for shipments by the major carriers, and adequate recording space may hence not exist for providing separate files of the necessary length for each of the additional carriers, for example, one to two hundred carriers whose services may be employed at various times.

The difficulty in tracking transactions of the other, or minor carriers, is further compounded by the fact that these minor carriers have varying pickup schedules, so that transactions relating to such minor carriers cannot be combined in a single file that is treated in the same manner as the files of the major carriers. In view of the different pickup schedules, for example, it is not possible to archive a complete combined file relating to the minor carriers, since at any given time it can be expected that at least a portion of such a combined file will be current.

BRIEF SUMMARY OF THE INVENTION

The present invention is hence directed to the provision of an improved method and apparatus enabling the tracking and recording of transactions of both major and minor carriers in an efficient manner, and without requiring excessive storage space for the recording of the transactions.

Briefly stated, in accordance with the invention, the disc space of a transaction disc is alloted one or more files for recording the transactions of major carriers and an additional, or "carrier logging", file alloted in common to all of the minor carriers. In this carrier logging file, the minor carriers are identified by number and the transactions with respect to these other carriers are recorded in records of predetermined length, for example, 80 bytes. As an example, in one embodiment of the invention this carrier logging file may carry record space for 1200 transactions.

In a further feature of the invention, a part of this carrier logging file includes two separate counters for each of the carriers handled by the file. One of the counters contains a count of the total number of transactions in the file relating to the respective carrier, and the other counter contains a total count of the transactions in the file relating to that carrier, which have been shipped. For example, record numbers 3–12 of the file may be reserved for the counters, the counters for each carrier being comprised of three bytes, with the counts being stored in compacted form to save memory space. The sequence of these counters, in the records of the file space, follows the sequence of predetermined identification numbers of the different carriers, so that the counts relating to any carrier can be recovered, or stored, on the basis of their position in the storage space. If desired, additional counters may be provided in the records of the file to store totals of the transactions of the individual carrier records.

The records of the carrier logging file which include the counters, may hence constitute a part of a file header. Additional records of the file, for example records 1 and 2, may include additional useful general data, such as the version of the program employed in recording and archiving, an archive flag, the total number of transactions in the file, the next available record, the last posting date, the last shipping date, the first transaction record, the lowest invoice number, the highest invoice number, etc.

BRIEF DESCRIPTION OF THE DRAWINGS

In order that the invention may be more clearly understood, it will now be disclosed in more greater detail with reference to the accompanying drawings, wherein.

DETAILED DESCRIPTION OF THE PREFERRED EMBODIMENTS OF THE INVENTION

Figure 1:
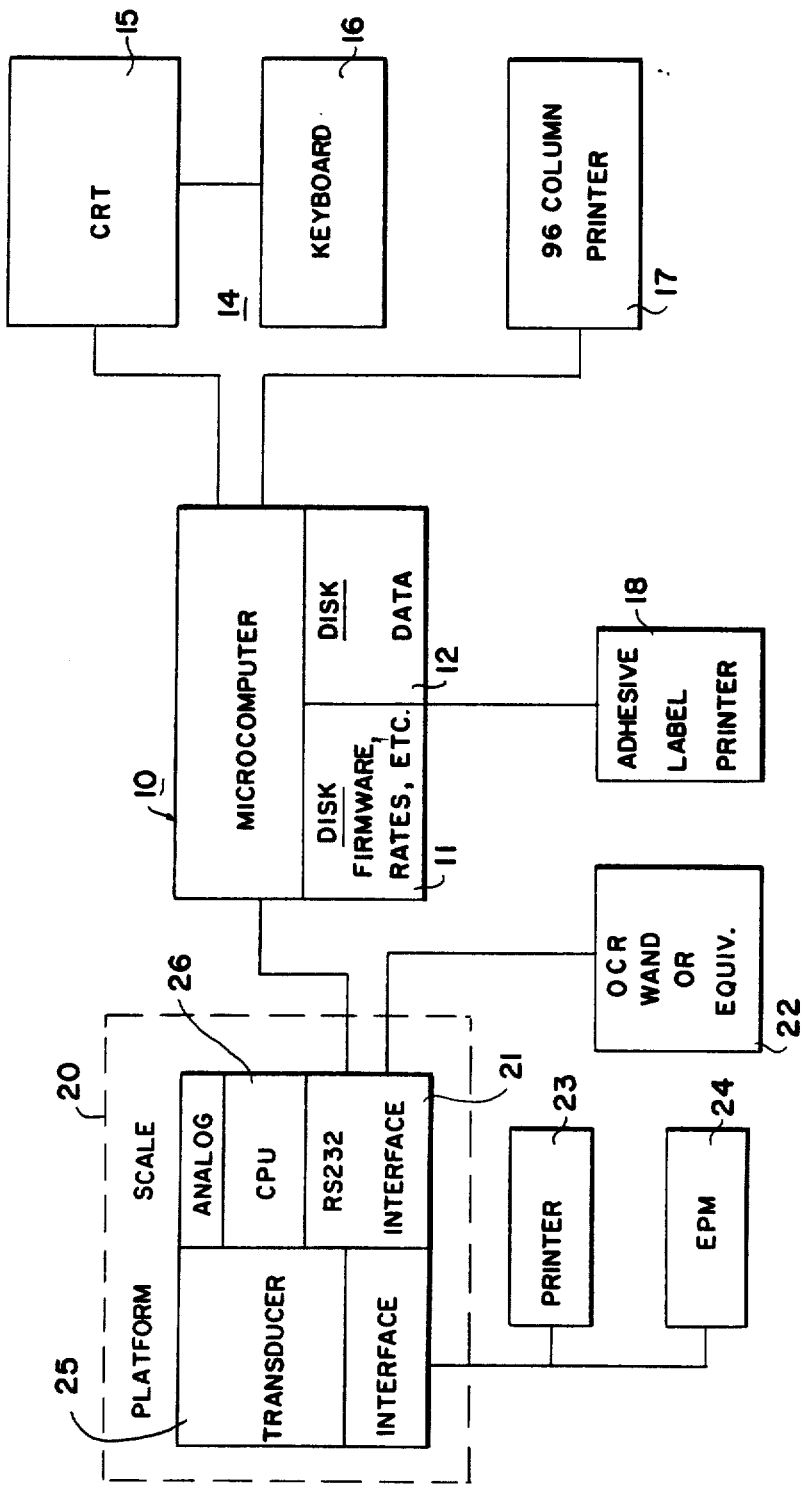
FIG. 1 is a block diagram of a computer manifest system that may be employed in the practice of the invention.

Referring now to FIG. 1, therein is illustrated a block diagram of a computer manifest system that may be employed in the practice of the invention. The system incorporates a microcomputer 10 having a first disc 11 containing the programs of the system and the various other data, such as rates, etc. The transactions are recorded on a second disc 12. The number of disc drives employed is a matter of choice, and hence provision is made by any conventional means for enabling archiving of the records on an archive disc, in accordance with a program of the invention. The microcomputer 10 is connected to a terminal 14 including a keyboard 16 for entering operator data and a display 15. The transactions may be recorded on a printer 17 connected to the microcomputer, and, if desired, the microcomputer may be adapted to print adhesive labels for the parcels in a printer 18. Further data input for the microcomputer, such as the weight of a parcel in a given transaction, is received from a platform scale 20 of conventional nature by way of an RS232 Interface 21. Further information for the microcomputer, relating to the parcels to be shipped, may be received from a wand 22 or the like also connected to the RS232 Interface. The scale 20 may also be interfaced to a printer 23 and an electronic postage meter 24 in conventional manner. The transducer 25 of the scale converts the weight of the parcel to electrical signals which are converted to digital form by the CPU 26 therein.

In use of the manifest system of FIG. 1, a parcel to be shipped is weighed by the scale 20 to provide weight information to be recorded on the transaction disc 12, other information for recording the transaction being input by way of the wand 22 and/or the keyboard 16 of the terminal. Data concerning the specific parcel may be printed by a printer 23, and the electronic postage meter 24 may be directed to print the required postage for the parcel. The microcomputer 10 may control the printing of an adhesive label for the parcel by way of the printer 18. The printer 18 may be conventionally employed to provide a complete record of transactions that have occurred, based upon data recorded on the transaction disc 12.

In accordance with the invention, the program of the microcomputer 10 is adapted to record transactions on the transaction disc 12 in one or more major carrier files, such as, for example, a file for the USPS or a file for UPS, and a carrier logging file on which transactions of a plurality of minor carriers are recorded. The major carrier files may be formatted in any convenient manner, the program treating each of these files as a common block for archiving and deleting of data.

The carrier logging file includes space for a determined number of records, for example, 1200 80-byte records, as well as a header including various data for the file and a pair of counters for each minor carrier whose transactions will be recorded in the file. The counters are preferably arranged sequentially in accordance with arbitrary identifying numbers assigned to the carriers, so that the counters for any carrier may be readily located. The records of the transactions in this file include, in addition to data necessary to record the transaction, the identification of the carrier to be employed for shipment of the parcel, and the status of the transaction i.e. whether or not the parcel has been shipped.

The counters assigned to each carrier record the total number of transaction records in the file associated with that carrier, and the number of closed transaction records in the file associated with that carrier. For example, the first counter assigned to carrier A counts the total number $Ct(A)$ of transaction records in the file associated with the carrier A. The second counter assigned to the carrier A counts the number $Cc(A)$ of closed transaction records associated with that carrier A, i.e. transaction records which describe parcels that have been shipped by carrier A. It is thus apparent that the number $Ca(A)$ of active transaction records associated with carrier A, i.e. transaction records assigned to carrier A but which have not yet been picked up by carrier A for shipment, is equal to $Ct(A) - Cc(A)$. The counters in the file header of the carrier logging file enable the selective archiving and data handling in accordance with the invention in a simple and effective manner.

For example, the provision of the counters as above described enable the archiving of records in the file relating to a given carrier, without disturbing records relating to other carriers, so that records of transactions relating to shipped parcels may be deleted and the space used in the recording of further transactions, while not interfering with records of transactions of other carriers not yet shipped. When record space has thus been deleted, it can of course be employed for the recording of further transactions in response to a test of the information in the record.

Figure 2:
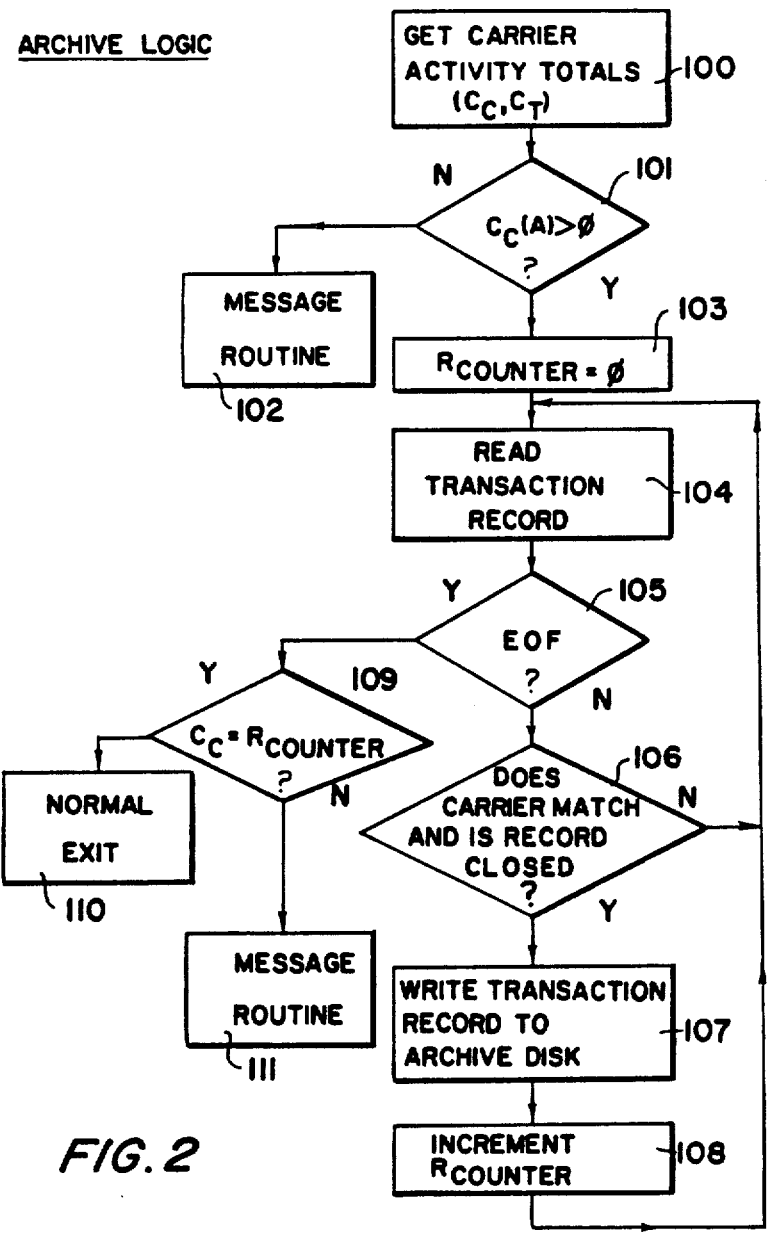
FIG. 2 is a flow diagram in accordance with the invention showing the archive logic.

FIG. 2 shows a method in accordance with the invention for archiving records of the carrier logging file. As shown in FIG. 2, at block 100 the headers of the file are interrogated to obtain the counts $Cc(A)$ and $Ct(A)$ for a given carrier A. If a count $Cc(A)$ is equal to zero, i.e., if there are no closed transaction records in the file associated with carrier A, as tested at block 101, a message routine 102 is invoked to advise the operator that there are no records present for that carrier that require archiving.

If closed transaction records are present for that carrier, however, a record counter is set to zero at block 103. The first transaction is then read at block 104. If an end of file was not found at block 105, a test is then made to determine if the transaction record that was read pertained to the specific carrier A, and, if so, if the transaction record that was read was closed, at block 106. If either of these tests is untrue, the program loops back to read the next transaction record. If both tests were true, however, the transaction record is written to the archive disc at block 107, and the record counter is incremented at block 108. The program then loops back to read the next transaction record. When the end of file has been found at block 105, a test is made at block 109 to determine if the total number of closed transaction records Cc(A) is equal to the record counter. If it is, a normal exit is made from the program at block 110. Otherwise, an error message indicating the inequality is given at block 111.

The program of FIG. 2 hence archives the closed transaction records of a given carrier in a simple and efficient manner. The program of FIG. 2 preferably also purges archived closed records from the carrier logging file. This may be effected, for example, in the exit routine 110, at which time Cc(A) is cleared (set to 0) and Ct(A) is updated. The program thus enables archiving the closed records of any given carrier so that the record space may be subsequently employed for recording a transaction therein of any desired carrier in the carrier logging file, without interfering with transaction records that have not been archived.

The archiving may be preceded by an initial determination if adequate space exists on the archive disk for archiving the closed transaction records. Thus, the Cc(A) counters provide an indication of the amount of memory needed to archive the closed transaction records of a given carrier, thereby enabling the simple comparison of the required space with the actual space remaining on the archive disk (which may be conveniently stored at any desirable location). The counts stored in the counters of the carrier logging file may also be conveniently employed for the determination of the amount of RAM memory that will be required for sorting of the records of the carrier logging file, by comparison of the required space as indicated by the stored counts and the amount of RAM memory that is in fact available.

Figure 3:
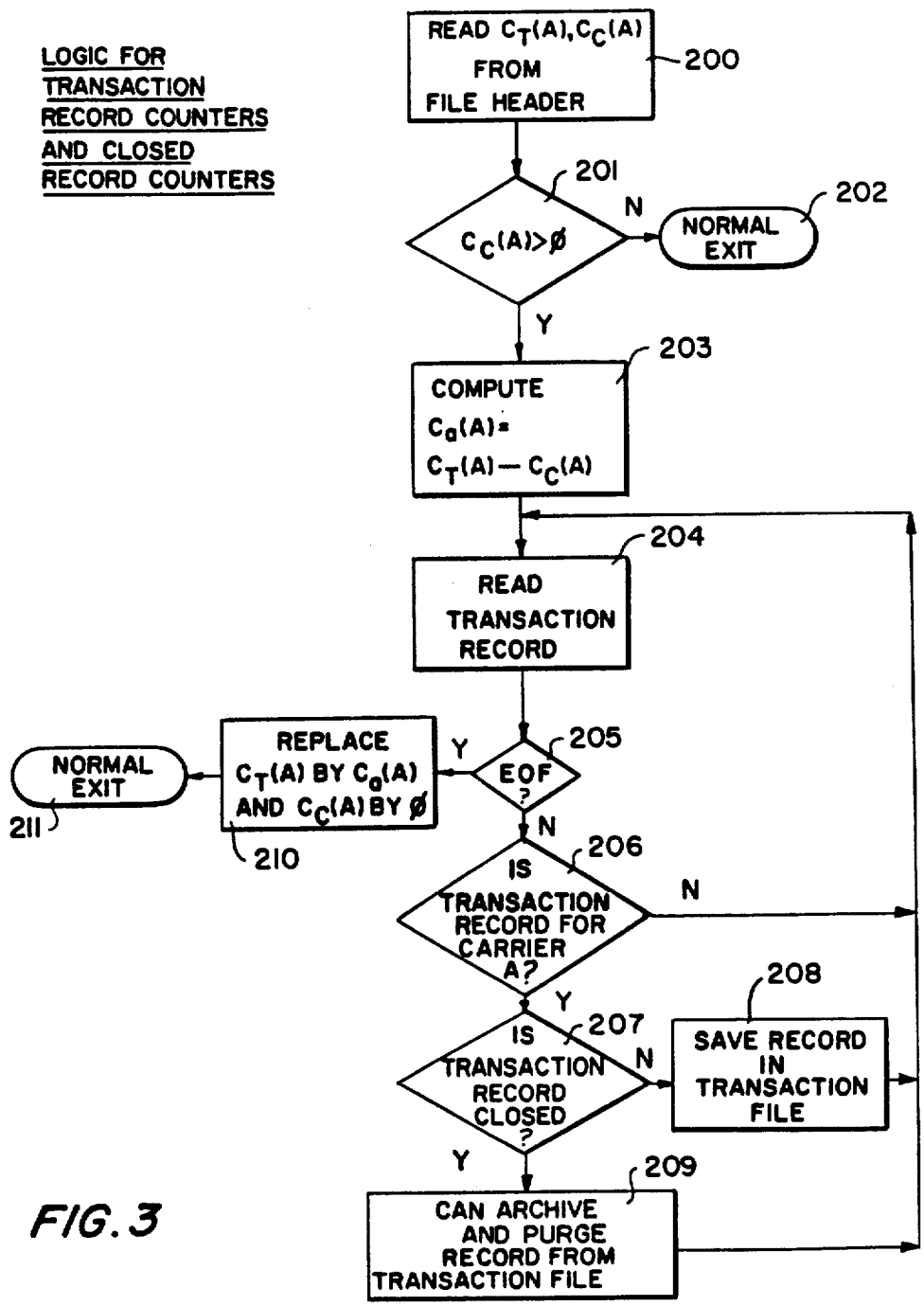
FIG. 3 is a flow diagram in accordance with the invention showing the logic for transaction record counters and closed record counters.

FIG. 3 is a flow diagram in accordance with the invention for archiving and purging transaction records, and updating the counters (Ct and Cc) associated with a given carrier. As illustrated in FIG. 3, the counts Ct and Cc corresponding to a given carrier are read from the file header at block 200, and the total number Cc of closed transaction records is tested at block 201. If no such closed transaction records exist, indicating that the transaction records for that carrier are up-to-date, the program exits at block 202. Otherwise, the sum Ca of open (active) and closed records for the carrier is computed at block 203. The first transaction record, or next transaction record, is read at block 204, and if no end of file is found at block 205 at 206, a test is made if the read transaction record corresponds to that carrier. If not, the program loops back to read the next transaction record in the file. If, on the other hand, the read transaction record does pertain to the given carrier, the program next tests to determine if the transaction record is closed. If the transaction record is not closed, the record is saved in the carrier logging file at block 208 and the program loops back to read the next transaction file. Otherwise, it is apparent that the transaction record must be archived and the record purged from the carrier logging file as indicated at block 209. Following any steps that have been determined desirable in block 209, the program loops back to read the next transaction record.

If an end of file is found at block 205, the count Ct of total records for that carrier is replaced by the calculated count Ca, and the number Cc of closed transaction records indicated in the counter and the file header is reset to zero, at block 210. The program then exits normally at block 211.

Figure 4:
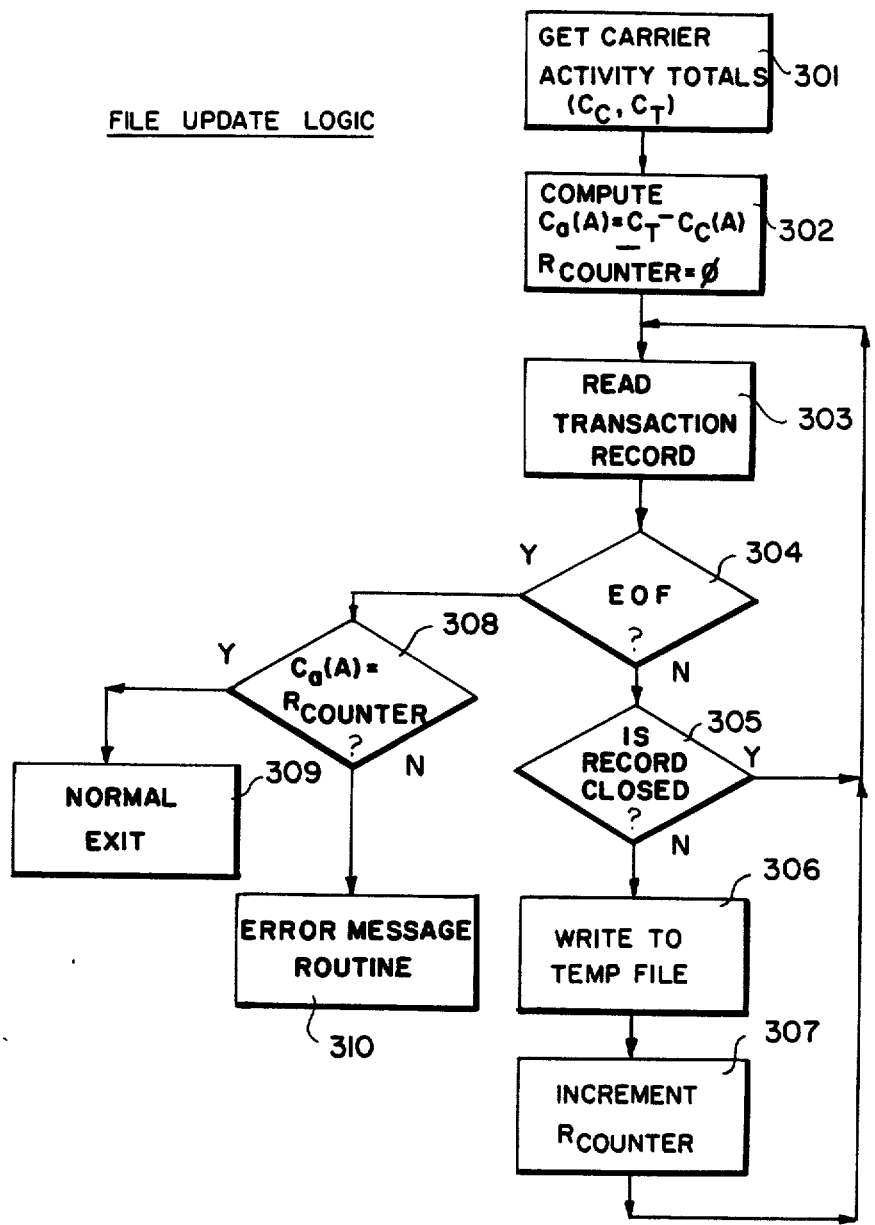
FIG. 4 is a flow diagram showing the file update logic in accordance with the invention.

In the file update routine of FIG. 4, the file header is read at block 301 to retrieve a number Cc of closed transaction records and the number Ct of total transaction records for that carrier, and the total number Ca of active transaction records is calculated at block 302, with a record counter being set to zero. The first transaction record is read at block 303 and tested for an end of file at block 304. If it is not the end of the file, a test is made at block 305 to determine if the record is closed. If the record is closed, the program looks back to read the next transaction record. If the record is open (active), however, it is written to a temporary .SAV file on the transaction disk in block 306, and the record counter is incremented at block 307, the program then looping back to read the next transaction record.

When an end of file has been detected, a test is made at block 308 to determine if the calculated sum Ca is equal to the number in the record counter of active transaction records. If the counts are equal, a normal exit is provided at block 309. Otherwise, an error message routine is invoked at block 310.

The program of FIG. 4 thus searches for all open transaction records of the carrier, and writes all of such open transaction records to memory.

One example of the organization of data in the records of the carrier logging file is illustrated in Table I.

TABLE I

| Record Position (Byte) | Stored Information |
| --- | --- |
| 1 | FLAG |
| 2 | Carrier No. |
| 3–4 | Number of Packages |
| 5–7 | Weight |
| 8–10 | Zip Code |
| 11–13 | Charges |
| 14–16 | Date |
| 17–19 | Time |
| 22–35 | Invoice No. |
| 36–40 | Class |
| 41–54 | Special data 1 |
| 55–68 | Special data 2 |
| 69–76 | Custom |
| 77–80 | Password |

As illustrated in Table I, the first byte of the record may store a Flag indicative of the states of the record, i.e. whether it is an active (open) record or whether it is a closed record with the related parcel having been shipped. The second byte of the record identifies the carrier numerically. Accordingly, the record contains information, which when accessed, enables the determination the status of the record, the related carrier number, and any further information that is needed to be recorded with respect to the transaction. It is of course apparent that other formats of data may be employed in the records and that the selection of a record length of 80 bytes is exemplary only. As discussed above, in the example of the invention, the first and second records may contain various useful information for the carrier logging file, such as the version number of the program employed in recording the data, an archive flag indicating if records can be archived, a status flag indicating if the file contains current data, a number indicating the next available record for recording, the last posting date that was used in the file, the last shipment date of a shipment recorded in the file, the location of the first transaction record in the file, the lowest invoice number of any transaction recorded in the file, the highest invoice number of any transaction recorded in the file, and any other useful general information as needed. The third through twelfth record of the file are reserved in accordance with this embodiment of the invention for the counters for the different carriers. It is of course apparent that the number and location of the records for the general information and counters may be varied as desired, the specific example given herein not being limiting.

Continuing with the above discussed example, with ten 80 byte records assigned as counters, the counters for each carrier associated with the file may be comprised of three contiguous fields, the groups of fields being assigned numerically sequentially in accordance with the identification numbers of the carriers so that the counters associated with each carrier can be readily located. In order to simplify indexing, so that each counter appears fully in a record, it is desirable to employ only 78 of the 80 bytes of each record. The records may hence be accessed by simple "put" and "get" instructions. In order to increase the possible count in each counter, the counts may be stored in condensed form in the three fields of the associated carrier, in accordance with any conventional algorithm. The two counters associated with each carrier may hence not be defined by discrete separate storage space.

Figure 5:
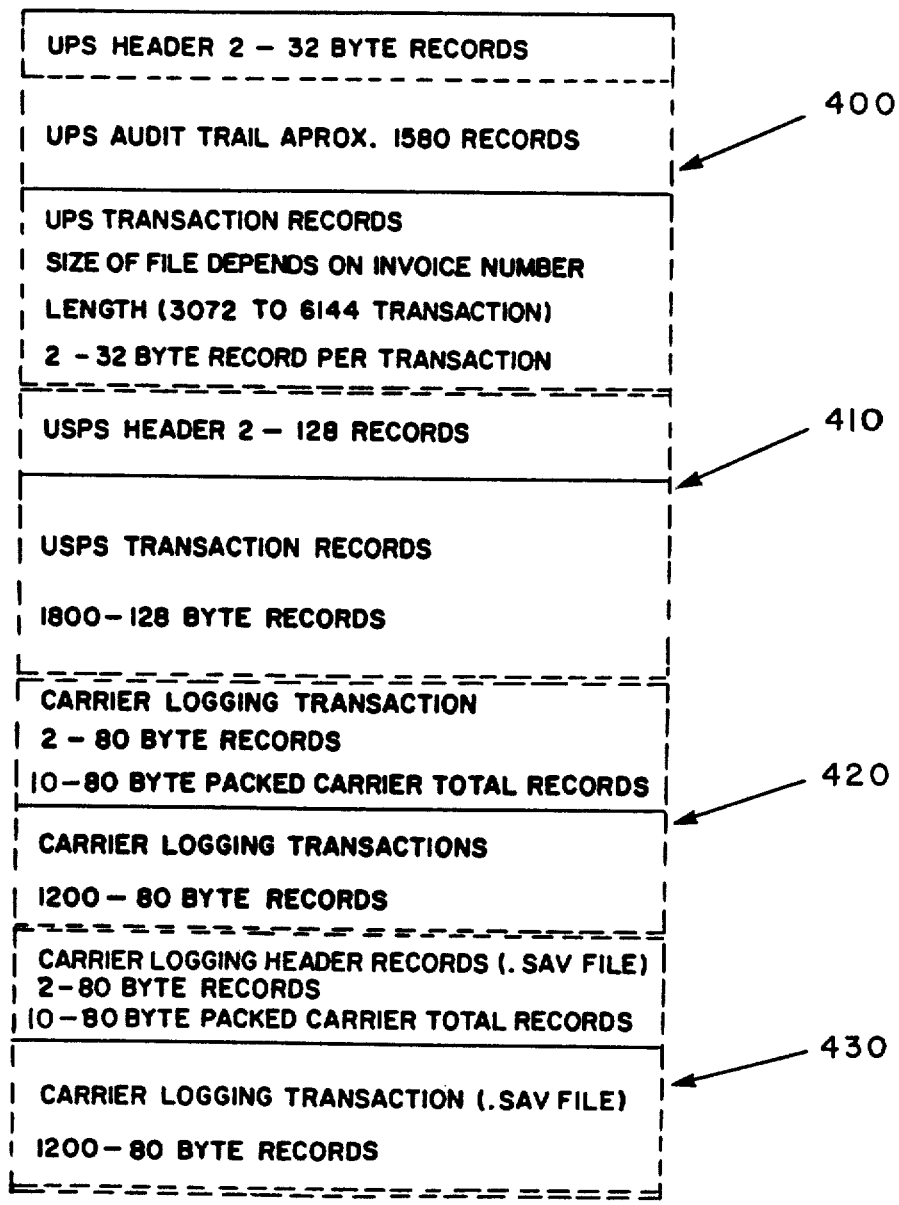
FIG. 5 is a chart illustrating the assignment of transaction disc space in accordance with one example of the invention.

FIG. 5 illustrates the distribution of records for different carriers on a 700 kilobyte disk in accordance with one embodiment of the subject invention. Files 400 and 410, relating to UPS and USPS transactions respectively, are of a conventional nature and form no part of the subject invention per se and will not be described further here. File 420 is a carrier logging file in accordance with the subject invention as described above. File 420 includes: 2 80 byte records as files one and two for storing additional useful general data such as the program version employed, the archive flag, the total number of transactions in the file, etc.; 10 80 byte records reserved for counters for each minor carrier and 1200 80 byte transaction records. File 430 is a duplicate file used as a temporary file during the file update procedure of FIG. 3 as described above. In accordance with the subject invention upon completion of the file update procedure the names of files 420 and 430 are interchanged to complete the update and provide a new temporary file.

While the invention has been disclosed and described with reference to a limited number of embodiments it is apparent that variations and modifications may be made therein and is therefore intended in the following claims to cover each such variation and modification as falls within the true spirit and scope of the invention.

What is claimed is:

1. A method of controlling a computer system to handle transactions, each related to one of a plurality of subjects and having one of a plurality of statuses; comprising the steps of:
    (a) creating a file of records;
    (b) reserving selected records of said file for a plurality of first and a plurality of second counters, wherein each of said subjects corresponds to one of said first counters and with one of said second counters;
    (c) recording transactions in separate, unreserved records on said files;
    (d) recording the number of said recorded transactions having a first status and relating to a selected one of said subjects in a one of said first counters corresponding to said particular subject; and,
    (e) recording the number of said recorded transactions related to said particular subject in a one of said second counters corresponding to said particular subject.

2. The method of claim 1 wherein said first status corresponds to a closed status, and further comprising summing the differences between said second and first counters associated with each of said subjects to determine the number of transactions having an active status recorded in said file.

3. The method of claim 1 further comprising creating a second file of records and recording thereon transactions relating to an additional subject, said additional subject not having related transactions recorded on said first file.

4. The method of claim 1 wherein said first status corresponds to a closed status.

5. The method of claim 4 further comprising determining the difference between said second and said first counter corresponds to said particular subject, said difference defining the number of active transactions recorded in said file and relating to said particular subject.

6. A method for controlling a computer system to handle transactions each related to one of a plurality of different subjects and each having either a closed status or an active status wherein said transactions are recorded in a file having a plurality of first counters each of said first counters storing the number of transactions recorded in said file and having a closed status and related to the respective corresponding subject, and a plurality of second counters, each of said second counters recording the number of transactions recorded in said file and relating to the respective corresponding subject; said method comprising the steps of:
    (a) reading the contents of one of said first and one of said second counters associated with a selected subject;
    (b) initializing a third counter;
    (c) sequentially reading said transactions recorded in said file, archiving each transaction recorded in said file and corresponding to said selected subject and having a closed status, and incrementing said third counter for each transaction that is archived, and then setting said first counter to zero and said second counter equal to the difference between said second counter and said third counter.

7. A method for controlling a computer system to update a first file of records of transactions each related to one of a plurality of subjects and having either a closed status or an active status, said file having a plurality of first counters each corresponding to one of said subjects and storing the number of transactions having a closed status and relating to the respective corresponding subject recorded in said file, a plurality of second counters each corresponding to one of subjects and storing the number of transactions relating to the respective subject recorded in said file; said method comprising the steps of:
    (a) creating a temporary file;
    (b) determining the difference between a one of said second and a one of said first counters associated with a selected subject, said difference corresponding to the number of active files corresponding to said selected subject;
    (c) initializing a third counter;

(d) sequentially accessing the records of said file and writing transactions related to said selected subject and having an active status to said temporary file while incrementing said third counter;

(e) and determining if said difference is equal to said third counter upon completion of said step of accessing said transaction records, whereby said temporary file may be verified as recording a complete set of transactions having an active status.

8. The method of claim 7 further comprising the steps of: repeating steps (b) through (e) of claim 7 for each of said subjects then deleting said first file, and then renaming said temporary file to have the name of said first file.

9. A method for controlling a computer system to handle transactions, each related to one of a plurality of different subjects and having either a closed status or an active status, wherein said transactions are recorded in a file having a plurality of first counters each corresponding to one of said subjects and storing the number of transactions recorded in said file and having a closed status and relating to the respective corresponding subject, and a plurality of second counters each corresponding to one of said subjects and storing the number of transactions recorded in said file and relating to the respective corresponding subject; said method comprising the steps of:

(a) determining the difference between a one of said second and a one of said first counters corresponding to a selected one of said subjects to determine the number of active transactions relating to said selected subject stored in said file;

(b) saving transactions recorded in said file and having an active status and relating to said selected subject; and, (c) setting said second corresponding counter equal to said difference and setting said first corresponding counter to zero.

10. A computer file structure comprising a file of records, said records recording transactions, each of said transactions relating to one of a plurality of subjects and having one of a plurality of statuses, each of said records including a number uniquely corresponding to said related subject of said recorded transaction, said file further having a file header having a plurality of first and a plurality of second counters, wherein each of said subjects corresponds to one of said first and with one of said second counters, said first counters recording the number of transactions recorded in said file and relating to the respective corresponding subjects and having a predetermined one of said statuses, and said second counters recording the number of transactions recorded in said file and relating to the respective corresponding subjects; said counters being arranged in said file in correspondence with the order of said numbers corresponding to said subjects.

11. In a parcel shipping system including a scale system for weighing items to be shipped and a recording system coupled to said scale system for recording data relating to said items, said recording system comprising a recording medium having a file structure for data recorded thereon and means for recording data on and reading data from said recording medium; the improvement wherein said file structure comprises a carrier logging file having records thereon corresponding to shipments of said items handled by one of a plurality of carriers and information indicating that said shipments each have one of a plurality of statuses, each record further including a number uniquely corresponding to the carrier handling the corresponding shipment and said file further comprising a file header having a plurality of first and a plurality of second counters, wherein each of said carrier corresponds to one of said first and one of said second counter, said first counters recording the number of shipments recorded in said file and handled by the respective corresponding carrier and having a predetermined one of said statuses, and said second counters recording the number of transactions recorded in said file and handled by the respective corresponding carrier, said counters being arranged in said file in correspondence with the order of said numbers corresponding to said carriers.

12. The parcel shipping system of claim 11 wherein said determined status is a closed status.

13. The parcel shipping system of claim 11 further comprising keyboard means coupled to said recording system for inputting further data thereto for recording on said recording medium.

14. The parcel shipping system of claim 11 wherein said recording system comprises a microcomputer and said recording medium comprises a magnetic disk.

* * * * *